United States Patent
Berdrin
[11] 3,713,494
[45] Jan. 30, 1973

[54] ALTERNATIVE INPUT DRIVES ON HOUSING OF GEARBOX FOR TOOLS ROTATING ABOUT VERTICAL AXES

[76] Inventor: Albert Berdrin, 119 Avenue de General-Leclerc, Paris, France

[22] Filed: Oct. 7, 1970

[21] Appl. No.: 78,692

[30] Foreign Application Priority Data

Oct. 10, 1969 France..............................6934671

[52] U.S. Cl. ..................172/59, 56/2, 56/11.4, 74/665 M, 74/665 Q, 172/125
[51] Int. Cl. .......................A01d 33/08, F16h 37/06
[58] Field of Search..............172/59, 110, 522, 526, 245–246, 172/250–254, 35, 125; 56/10, 8, 11.1–11.2, 295, 15.1, 2, 11.4; 74/665 F, 665 H, 665 M, 665 L, 665 N, 665 Q; 198/203

[56] References Cited

UNITED STATES PATENTS

| | | | |
|---|---|---|---|
| 2,446,660 | 8/1948 | Mulkey et al. | 198/203 |
| 3,387,436 | 6/1968 | Kasper | 172/49 |
| 2,854,807 | 10/1958 | Byler et al. | 56/295 |
| 3,367,425 | 2/1968 | Heeren | 172/59 |
| 2,978,858 | 4/1961 | Moody | 56/295 |

FOREIGN PATENTS OR APPLICATIONS

| | | | |
|---|---|---|---|
| 6,714,826 | 5/1969 | Netherlands | 172/59 |
| 6,715,977 | 5/1969 | Netherlands | 172/59 |

*Primary Examiner*—Robert E. Pulfrey
*Assistant Examiner*—C. W. Hanor
*Attorney*—Karl F. Ross

[57] ABSTRACT

An agricultural machine with tools adapted to rotate around vertical axis. The tools are carried by shafts located in a housing enclosing intermeshing gear means for driving the shafts by driving one of them only, apertures closable by covers being provided on the faces of the housing for the passage of a driving shaft.

2 Claims, 3 Drawing Figures

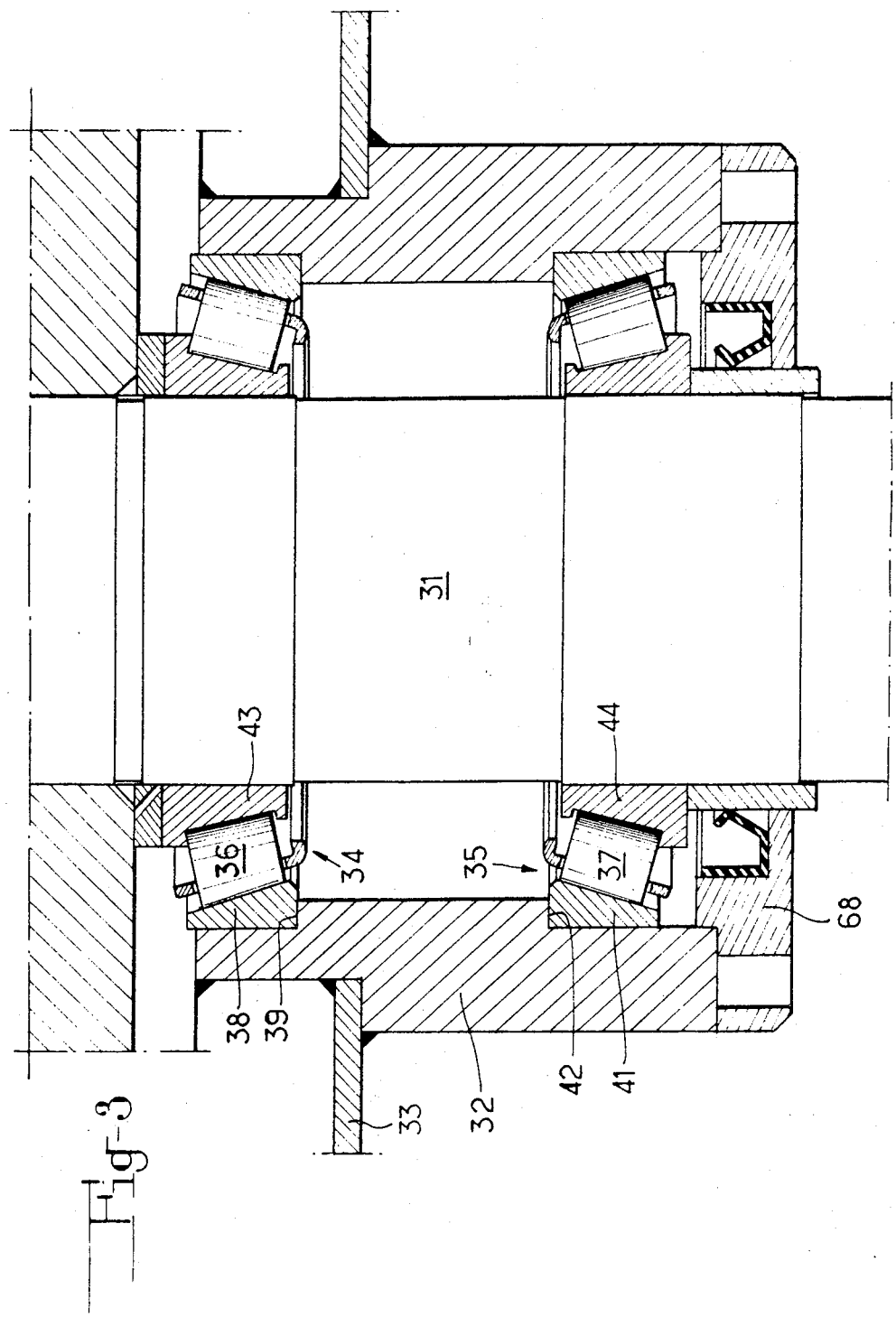

ALTERNATIVE INPUT DRIVES ON HOUSING OF GEARBOX FOR TOOLS ROTATING ABOUT VERTICAL AXES

FIELD OF THE INVENTION

The invention concerns multiple-purpose agricultural machines.

It relates to machines which comprise a casing or housing carried, frequently by a three-point suspension, by a motor vehicle — such as a tractor, and which carry tools with substantially vertical parallel axes driven through a power drive provided on the front side of the casing.

BACKGROUND OF THE INVENTION

Owing to the stresses to which the tools are subjected, to the vertical arrangement of the tool-carrying shafts which entails stresses, the reactions of which are difficult to absorb, these agricultural machines have had, up to now, only comparatively restricted uses.

OBJECTS OF THE INVENTION

It is an object of the invention to open a wider scope for the utilization of such agricultural machines, with respect to the variety of tools which may be fixed on the working shafts as well as to the ease in mounting the tools and to the adjustments which may be made to avoid any looseness generating wear, vibrations, etc..

The machine is particularly sturdy and adapted to work under the hard conditions of agricultural labor.

DESCRIPTION OF THE DRAWING

The following description, made by way of example, refers to the appended drawing, wherein:

FIG. 3 is an enlarged view of part of FIG. 2.

SPECIFIC DESCRIPTION

Figure 1:
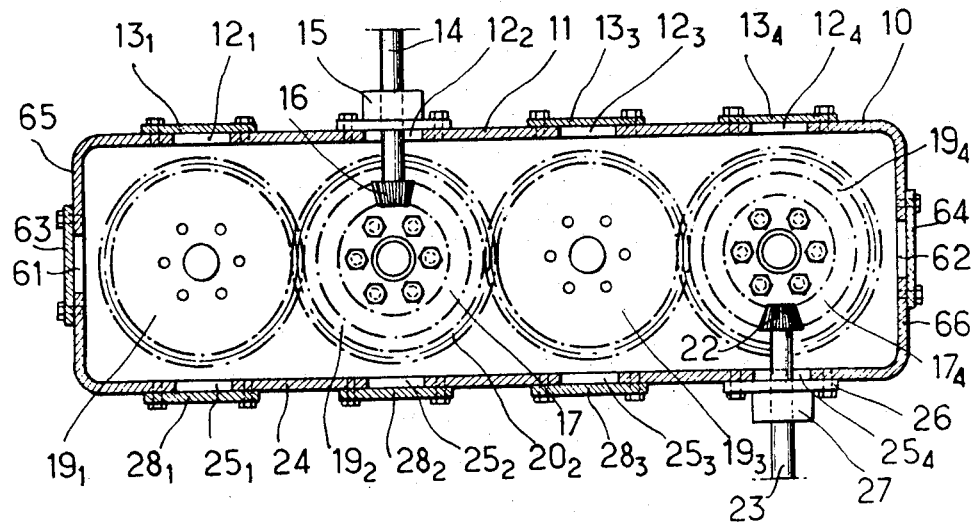
FIG. 1 is a diagrammatic plan view in section below the upper wall;.
Figure 2:
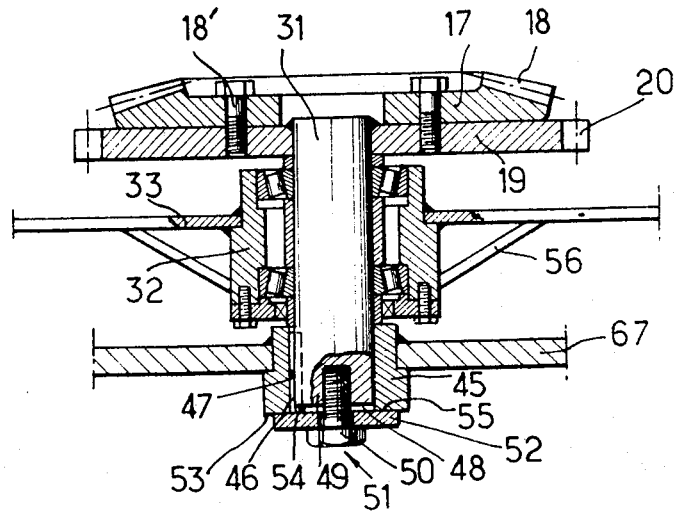
FIG. 2 is a sectional view of a working shaft device together with its drive and a tool carrier.

The machine comprises a casing or housing 10 of a general parallelepipedal shape, which may be fixed by a three-point suspension onto a motor vehicle such as a tractor. The large walls of the casing are transverse to the direction of motion of the vehicle, and the front face 11 includes four apertures $12_1$–$12_4$, which may be tightly sealed with covers, $13_1$–$13_4$ respectively, one of these apertures, chosen at will, allowing the passage of a driving shaft 14 journalled in a roller bearing assembly 15 and which may be driven at any one of the speeds supplied by a gear-box, not shown, connected to the motor. At its end which is inside the casing 10, the shaft 14 carries a bevel pinion 16 which meshes with a bevel crown gear 17 with teeth 18. This crown gear is fixed by screws or bolts 18' to a cylindrical gear 19 with outer cogs 20. In the condition shown in FIG. 1, it is the gear $19_2$ which is driven by the shaft 14. It meshes through its outer teeth $20_2$ with the gear $19_1$ on one hand and with the gear $19_3$ on the other hand, this latter meshing with the gear $19_4$. This gear $19_4$ is rigidly fixed to a bevel gear $17_4$ co-acting with a bevel pinion 22 at the end of a shaft 23 entering the casing 10 through the rear side 24 via an aperture $25_4$ provided in this latter, the aperture being tightly sealed with a cover 26 to which is rigidly fixed a roller bearing assembly 27 journalling the shaft 23. The other apertures $25_1$–$25_3$ in the rear wall are tightly sealed with covers $28_1$–$28_3$.

The casing 10 is filled with oil.

The gear 19 is rigidly fixed to a working shaft 31 journalled in a cylindrical support or sleeve 32 by means of two roller bearings 34 and 35 with conical rollers, 36 and 37 respectively. The cylindrical support 32 is rigidly fixed to a structure or skeleton member 33, or plate, a conical brace 56 being advantageously provided. The outer collar or race 38 of the roller bearing 34 co-operates with a shoulder 39 on the cylindrical support or sleeve 32 and the outer collar or race 41 of the roller-bearing 35 co-operates with a shoulder 42 on the support. The inner collars or race 43 and 44 are fixed on the shaft 31. The collar 44 is held in position by a holding part or ring 68.

Co-operating with the shaft 31, a tool carrier 45 is fixed by means of splines 46 set into grooves 47 in the shaft 31. On its front side 48, the shaft 31 has a threaded bore 49 which co-operates with the threaded rod 50 of a bolt 51, the head of which bears against with a small plate or disk 52, itself abutting with the front side 53 of the tool-carrier 45. One or several washers or liners, if needed, may be provided in the space 54 provided between the interior face 55 of the disk 52 and the front side 48 of the shaft 31.

The machine may carry as many tools as there are shafts 31, four in number in the example.

All the tools are driven by the shaft 14 which is inserted in one of the openings 12 according to the relative position with respect to the tractor which is desired for the apparatus.

One or several shafts such as are shown at 23 may, if so needed, drive other applicances.

Openings 61 and 62, tightly sealed by covers 63 and 64, may be provided on the small faces 65 and 66 of the casing 10. These apertures are intended for the passage of shafts, if necessary.

A tool is mounted by sliding the tool-carrier 45 onto the shaft 31, then by placing the plate 52 in position and securing the connection with the bolt 51; the plate and the tool-carrier 45 being clamped together by screwing the bolt 51, this ensures a playfree connection by means of the conical roller-bearings 34 and 35. One or several washers or shims are interposed if necessary.

The tool is taken off in the reverse fashion.

Both operations may be performed by the farmer himself.

This playfree transmission is suitable to drive the most varied tools, one of which is diagrammed at 67; not only tools to work the soil but also clearing tools, mowing tools, etc. can be used.

What is claimed is:

1. A transmission for an agricultural machine adapted to drive a plurality of tools, said transmission comprising:

a parallelepipedal housing having a plurality of walls including at least one horizontal and at least one vertical wall defining the interior of said housing;

a plurality of working shafts journaled in said horizontal wall for rotation about respective parallel vertical axes;

intermeshing gear means connecting said shafts and including a gear mounted on each of said shafts for rotation of all of said shafts upon rotation of one of said gears;

means on said shafts for selectively connecting agricultural tools thereto below said horizontal wall, said one vertical wall being provided with a plurality of closable holes each substantially registering with a respective one of said gears;

a bearing assembly registrable with a selected one of said holes and adapted to be fixed to said housing; and a drive shaft journaled in said bearing assembly, extending through said one of said holes and carrying a pinion within said housing operatively connected with a corresponding one of said gears for driving same.

2. The agricultural-machine transmission defined in claim 1 further comprising:

a cylindrical sleeve fixed to said horizontal wall and coaxially receiving each of said working shafts;

Two conical roller bearings with opposite inclinations axially spaced apart along each of said working shafts and received between the respective working shaft and its sleeve;

a tool-carrying socket splined to at least one of said working shafts below its sleeve;

a threaded bore formed in the bottom of said working shaft;

a bolt threaded into said bore; and a retaining disk held by said bolt against said socket.

* * * * *